US007667351B2

(12) United States Patent
Marwali et al.

(10) Patent No.: US 7,667,351 B2
(45) Date of Patent: Feb. 23, 2010

(54) METHOD FOR PULSE WIDTH MODULATION SYNCHRONIZATION IN A PARALLEL UPS SYSTEM

(75) Inventors: Mohammad Nanda Rahmana Marwali, Lewis Center, OH (US); Kevin Kim Eschhofen, Lewis Center, OH (US); Brian Paul Heber, Delaware, OH (US)

(73) Assignee: Liebert Corporation, Columbus, OH (US)

( * ) Notice: Subject to any disclaimer, the term of this patent is extended or adjusted under 35 U.S.C. 154(b) by 74 days.

(21) Appl. No.: 12/038,417

(22) Filed: Feb. 27, 2008

(65) Prior Publication Data

US 2008/0265680 A1 Oct. 30, 2008

Related U.S. Application Data

(60) Provisional application No. 60/914,617, filed on Apr. 27, 2007.

(51) Int. Cl.
*H02J 1/00* (2006.01)
(52) U.S. Cl. ....................................................... 307/87
(58) Field of Classification Search ................... 307/87
See application file for complete search history.

(56) References Cited

U.S. PATENT DOCUMENTS

| 6,466,465 | B1 | 10/2002 | Marwali |
| 6,563,048 | B2 | 5/2003 | Holt |
| 6,700,351 | B2 | 3/2004 | Blair |
| 6,768,223 | B2 | 7/2004 | Powell |
| 6,917,124 | B2 | 7/2005 | Shetler |
| 7,132,951 | B2 | 11/2006 | Ziejewski |
| 7,405,494 | B2 * | 7/2008 | Tassitino et al. .............. 307/45 |
| 2004/0160214 | A1 | 8/2004 | Blair |
| 2006/0006741 | A1 | 1/2006 | Tassitino, Jr. et al. |
| 2006/0175904 | A1 | 8/2006 | Powell |
| 2006/0193158 | A1 | 8/2006 | Fukaya et al. |
| 2006/0290205 | A1 | 12/2006 | Heber |
| 2007/0007825 | A1 | 1/2007 | Heber |

OTHER PUBLICATIONS

Liu, Y., Huang, L., and Hirachi, K. "A Novel Distributed Control Scheme for the Parallel Operation of Digital Controlled UPS." IECON-2003, Proceedings of the 29th Annual Conference of the IEEE Industrial Electronics Society, Nov. 2, 2003, vol. 1, pp. 668-672, United States of America.
Roberto Braccini, International Search Report for International Patent Application No. PCT/US2008/056375, European Patent Office, Netherlands, Mar. 3, 2008.
Roberto Braccini, Written Opinion for International Patent Application No. PCT/US2008/056375, European Patent Office, Netherlands, Mar. 3, 2008.

* cited by examiner

*Primary Examiner*—Robert L. Deberadinis
(74) *Attorney, Agent, or Firm*—Locke, Lord, Bissell & Liddell LLP

(57) ABSTRACT

A method for pulse width modulated pulse synchronization in a parallel UPS system uses the locally measured critical bus voltage to detect a zero crossing and adjust the PWM pulse to coincide with the zero crossing. No communication between the units is required to perform synchronization, and no "master" and "slave" relationship exists to thereby increase the total system reliability.

20 Claims, 8 Drawing Sheets

METHOD FOR PULSE WIDTH MODULATION SYNCHRONIZATION IN A PARALLEL UPS SYSTEM

CROSS REFERENCE TO RELATED APPLICATIONS

This application claims priority to and benefit of U.S. Provisional Application Ser. No. 60/914,617, filed on Apr. 27, 2007, the entire disclosure of which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The present invention relates generally to uninterruptible power supply (UPS) systems, and more particularly to two or more UPS systems connected and operated in parallel wherein pulse width modulated (PWM) pulse synchronization between the UPS systems takes place using the locally measured critical bus voltage to detect zero crossing.

2. Background of the Invention

A UPS system is used in applications that require continuity of power, such that when the main power source fails, the UPS system provides power from a reserve energy stored system, typically in the form of a battery. The UPS system monitors the main power source and controls the UPS components to provide continuous power to a critical load.

To provide further continuity of power, multiple UPS units may be paralleled with other UPS units to form a redundant and scalable UPS system with a given multiplicity. This system adds redundancy in that any UPS unit may be disconnected from the critical load for service or automatically by the UPS unit to isolate a faulty unit. The remaining unit(s) still provide power to the critical load. In addition, this system allows flexibility in increasing the total power capacity of the system. Typically, when UPS units are paralleled, some unit-to-unit wiring is added to facilitate the sharing of power and the connection or disconnection of units.

In parallel UPS systems, the PWM pulse switching periods are required to be synchronized to minimize circulating currents. Due to a fundamental limitation of digital control law, a digital load sharing control loop can only affect harmonic components of the output currents from the fundamental frequency up to one-half of the PWM pulse frequency. Even when proper load sharing control at relatively low frequency can be achieved using an appropriate digital load sharing loop, there are instances when high frequency components of the circulating currents exist. These high frequency circulating currents arise as a result of PWM pulses not being synchronized when multiple UPS units are connected in parallel.

In order to minimize these high frequency circulating currents, the PWM pulses must be synchronized in all units of the parallel connected UPS system. Typically, synchronization is accomplished using a "master" controller which sends a synchronization pulse to all other units in the UPS system where the other units act as "slaves." All the "slave" units will then synchronize their PWM pulses to the "master's" PWM pulses. Although this technique is acceptable, this technique requires additional wiring between units to transmit the synchronization pulse, and the existence of "master-slave" relationships results in single point failure which decreases the reliability of the overall system.

A need has thus arisen for a method for PWM pulse synchronization in a parallel UPS system which does not require additional wiring between units and does not rely on a "master-slave" controller relationship.

BRIEF SUMMARY OF THE INVENTION

In one aspect of the present invention, a method for pulse width modulated pulse synchronization in a parallel UPS system uses the locally measured critical bus voltage to detect a zero crossing and adjust the PWM pulse to coincide with the zero crossing. No communication between the units is required to perform synchronization, and no "master" and "slave" relationship exists to thereby increase the total system reliability.

DETAILED DESCRIPTION

Figure 1:
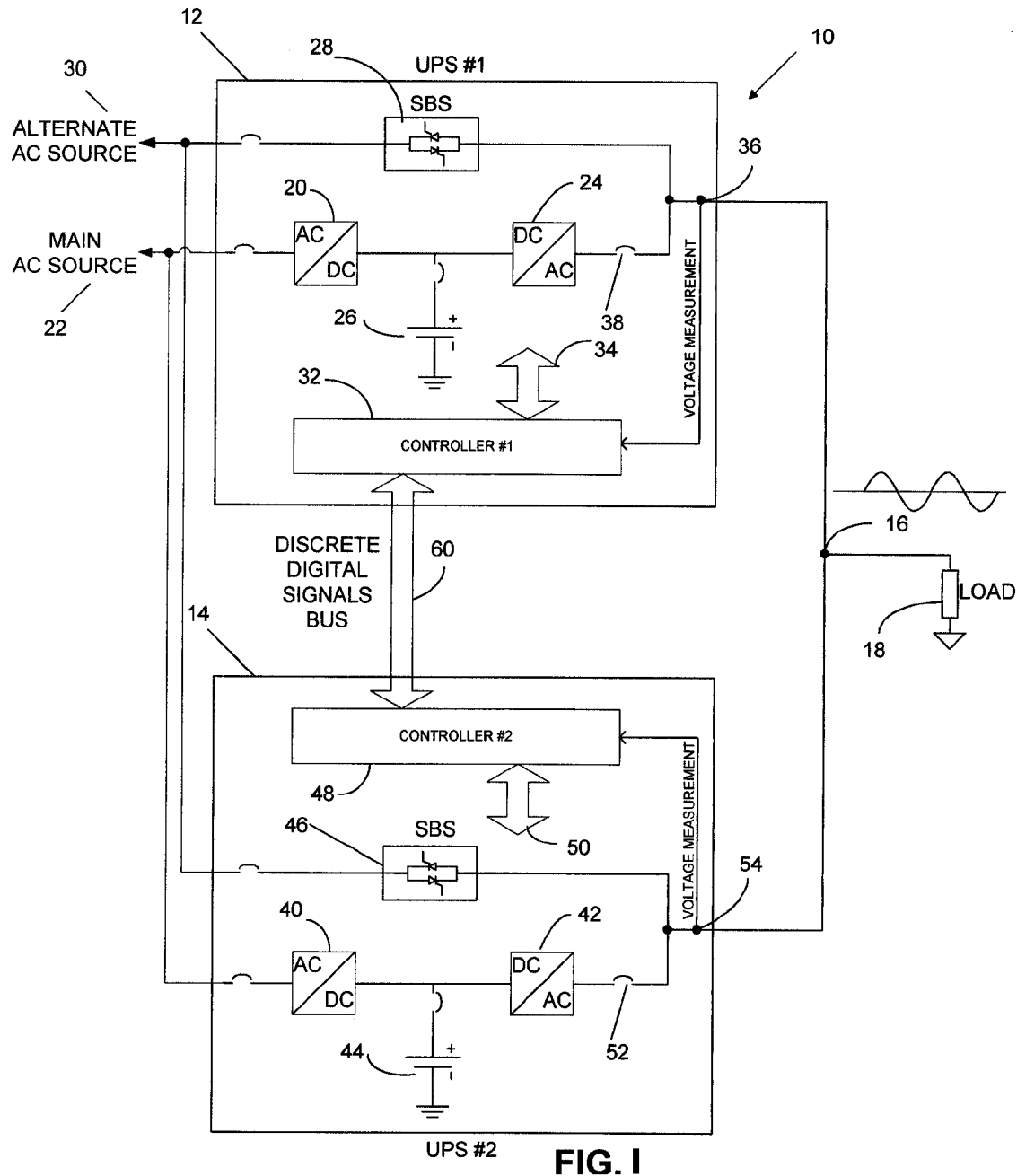
FIG. 1 illustrates a block diagram of a typical UPS system.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Computer programs for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package.

In general, Applicants have created a method for pulse width modulated pulse synchronization in a parallel UPS system uses the locally measured critical bus voltage to detect a zero crossing and adjust the PWM pulse to coincide with the zero crossing.

Referring to one of many possible embodiments of the invention, in FIG. 1 the present method is used with an illustrative UPS system, generally defined by the numeral 10. UPS system 10 includes a UPS unit 12 and a UPS unit 14 connected in parallel to create UPS system 10. Although two UPS units 12 and 14 are illustrated in FIG. 1, it should be understood that any number of UPS units may be connected in parallel, and units 12 and 14 are shown for illustrative purposes only. The output of units 12 and 14 generate a critical bus voltage 16 (FIG. 3a) which is applied to a critical load 18.

UPS unit 12 includes a rectifier 20 that converts input power from an AC power source 22 to DC power. AC power source 22 may be provided from utility power or another AC power source such as a generator. Rectifier 20 is connected to a first power source, also referred to as an inverter 24 which converts the DC power to a regulated conditioned AC power. A battery 26 provides reserved DC energy in the event that there is a utility power outage.

UPS unit 12 further includes a static bypass switch (SBS) 28 which connects an alternate AC source 30 to load 18 in the event that first power source 24 fails. Alternative AC source 30 may optionally be connected to the same source as AC source 22 or it may be supplied from a separate AC source. Devices suitable for static bypass switch 28 include SCRs, triac and IGBT, for example. UPS unit 12 further includes a controller 32 which controls the operation of unit 12 including operation of rectifier 20, activation/deactivation of SBS 28, and controlling operation of inverter 24. Control of these components is through control and feedback signal measurements provided on bus 34. The output voltage 36 of inverter 24 is normally part of the feedback signal measurement of bus 34, but is shown separately in FIG. 1 being applied to controller 32 to describe the present method.

A circuit breaker 38 is also provided within UPS unit 12. A request to transfer power from source 30 to inverter 24 is accomplished by closing circuit breaker 38 and turning off SBS 28.

Under normal conditions, inverter 24 supplies power to critical load 18. In the event that inverter 24 fails, controller 32 turns off inverter 24 and turns on SBS 28 thereby transferring critical load 18 from inverter 24 to the alternative source 30 thereby maintaining power to critical load 18.

To provide further redundancy and scalability, UPS units, such as UPS unit 12 may be paralleled with additional UPS units such as second UPS unit 14. UPS unit 14 has the same subsystems as UPS unit 12 including a rectifier 40, inverter 42, battery 44, SBS 46, controller 48, bus 50 and circuit breaker 52. The output voltage 54 of inverter 42 is applied to controller 48.

As previously stated, a plurality of UPS units 12 and 14 may be connected in parallel and controllers 32 and 48 in each unit is configured to operate in tandem with the other controller(s). Communications between UPS units 12 and 14 are accomplished utilizing a discrete digital signals communications bus 60.

Figure 2:
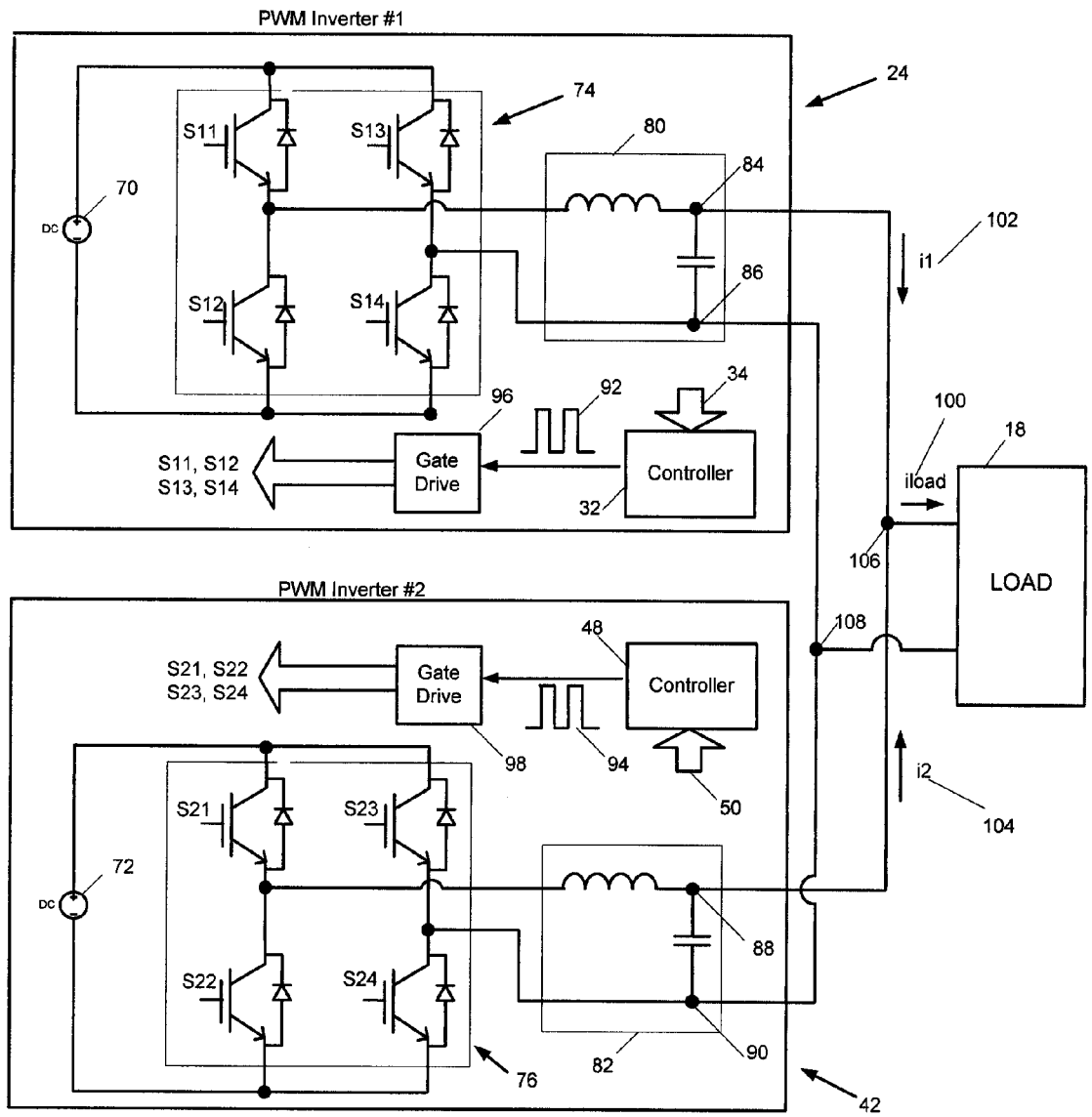
FIG. 2 illustrates a block diagram of one embodiment utilizing the present invention.

Referring now to FIG. 2, an embodiment of inverters 24 and 42 (FIG. 1) in the form of two single phase PWM inverters in parallel feeding load 18, in a parallel UPS system is illustrated. Although two inverters 24 and 42 are illustrated, it should be understood that the present method can be utilized with more than two units, and either single phase, three phase or other multi-phase PWM pulse inverters in parallel can be used. PWM inverters 24 and 42 include the following subsystems.

A DC source 70, 72 is typically obtained using an AC/DC rectifier and/or a battery storage system. Inverters 24 and 42 also include a PWM bridge converter, generally identified by the numerals 74 and 76 which are illustrated for a single-phase configuration and consisting of power switches with anti-parallel, free-wheeling diodes (S11, S12, S13 and S14 in inverter 24 and S21, S22, S23 and S24 in inverter 42). The power switches illustrated are shown as IGBT, but other power switches such as MOSFET or BJT can be utilized.

Inverters 24 and 42 also include a filter 80 and 82 which include an inductor/capacitor filter for filtering the high frequency components of the output voltage measured between points 84 and 86 in inverter 24 and between points 88 and 90 in inverter 42. Output voltage resembles as close as possible a sinusoidal wave form varying at the fundamental frequency (60 Hz/50 Hz).

A digital controller, 32 and 48, measures voltages and currents in the systems as feedback signals 34 and 50 respectively, to control operation of PWM inverters 24 and 42, as is well-known to those of skill in the art. Controllers 32 and 48 generate PWM control signals 92 and 94, respectively, that are fed to a gate drive 96 and 98, respectively, which provide drives for the power switches S, of the PWM bridge converters 74 and 76. See, e.g., U.S. Pat. No. 6,466,465, the subject matter and disclosure of which is hereby incorporated by reference for all purposes.

Controllers 32 and 48 function to obtain a voltage that follows a sinusoidal reference at fundamental frequency 60 Hz/50 Hz. The sinusoidal reference voltage is derived, for example, by each controller 32, 48 from a voltage reference that exists in the UPS system, such as an alternate AC voltage source which is common to both UPS units 12 and 14 or some additional generated voltage reference that is fed commonly to both controllers 32 and 48. Based on the system's 10 voltages and currents feedback measurement, the controllers 32 and 48 produce PWM pulses controlling the power converter in order to force the output voltage to follow its reference.

Controllers 32 and 48 additionally function to force the load current 100 to be shared equally by UPS units 12 and 14 in parallel, which in this instance forces output current i1, 102 to equal output current i2, 104. Note that current 100 is the sum of currents 102 and 104. When current 102 does not equal current 104, circulating current exists between UPS units 12 and 14, and it is the goal of controllers 32 and 48 to minimize or remove this circulating current in order to increase overall system 10 efficiency and/or prevent UPS units 12 and 14 from becoming overloaded.

The present method of PWM pulse synchronization does not require any additional communication between UPS units 12 and 14 in the form of physical wired connections. Controllers 32 and 48 of units 12 and 14, respectively use their locally measured output voltage between points 84 and 86 of inverter 24 or between points 88 and 90 of inverter 42 as a mechanism to synchronize the PWM pulses. This technique ignores the voltage drops of the power wiring, the voltages between points 84 and 86, 88 and 90, and 106 and 108 all being essentially the same. As can be seen, the present method does not require extra wiring between units 24 and 42 and removes the need for creating "master" and "slave" relations, thereby increasing the total system reliability.

Figure 3:
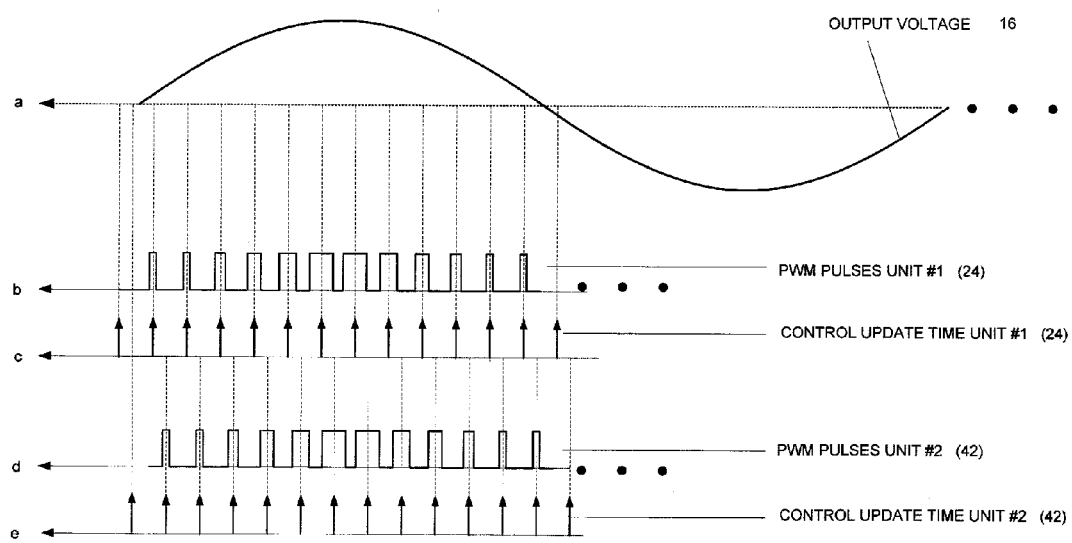
FIGS. 3 and 4 illustrate timing diagrams useful with embodiments of the present invention.
Figure 4:
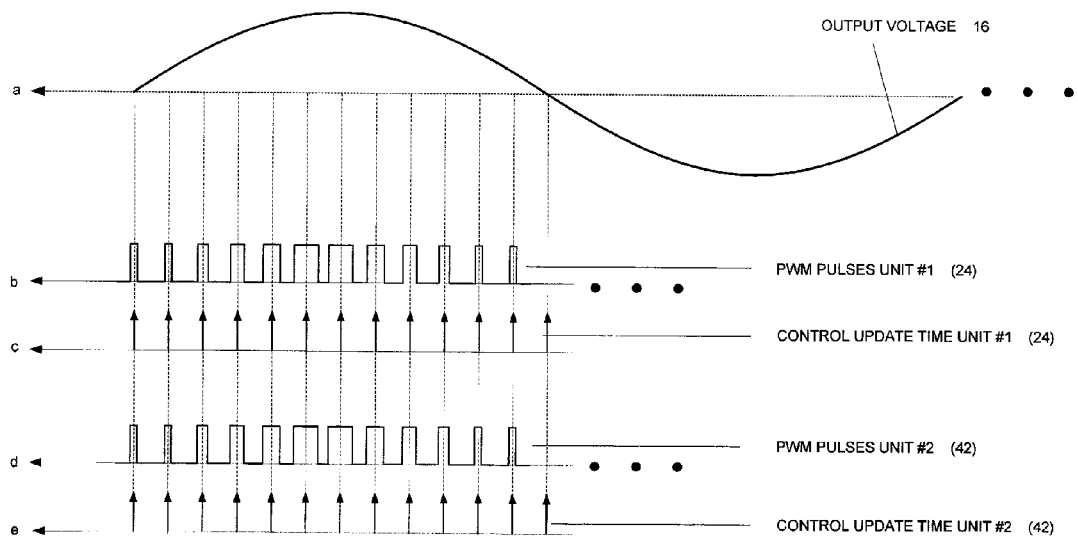

Referring now to FIGS. 3 and 4, FIG. 3 illustrates PWM pulses which are not synchronized between units 24 and 42 whereas, in accordance with the present invention, FIG. 4 illustrates synchronization between PWM pulses between units 24 and 42. In FIG. 3, neither of the PWM pulses from unit 24 (FIG. 3b) or unit 42 (FIG. 3d) are synchronized to the output voltage zero crosses (FIG. 3a). Also, the control update time at which each controller 32, 48 samples the measurement signals and employs these signals as feedback signals as a digital control loop strategy to generate new PWM pulse commands at every PWM pulse period is illustrated in FIGS. 3c and 3e, respectively and is not synchronized to the output voltage zero crosses. The control update time of each unit is shown synchronized with its PWM pulse generation.

As illustrated in FIG. 4, the present method synchronizes PWM pulses to a locally measured output voltage zero cross (FIG. 4a). Since the control update time (FIGS. 4c and 4e) coupled to the PWM pulse generation (FIGS. 4b and 4d) the result is that the control update time will be synchronized between units. Controllers 32 and 48 function to achieve and maintain this synchronization by continuously adjusting the PWM period of the pulses, such that a fixed integer N number of PWM pulses occurs every one line cycle of the output voltage, and forces the control update time to coincide with the zero crosses.

Figure 5:
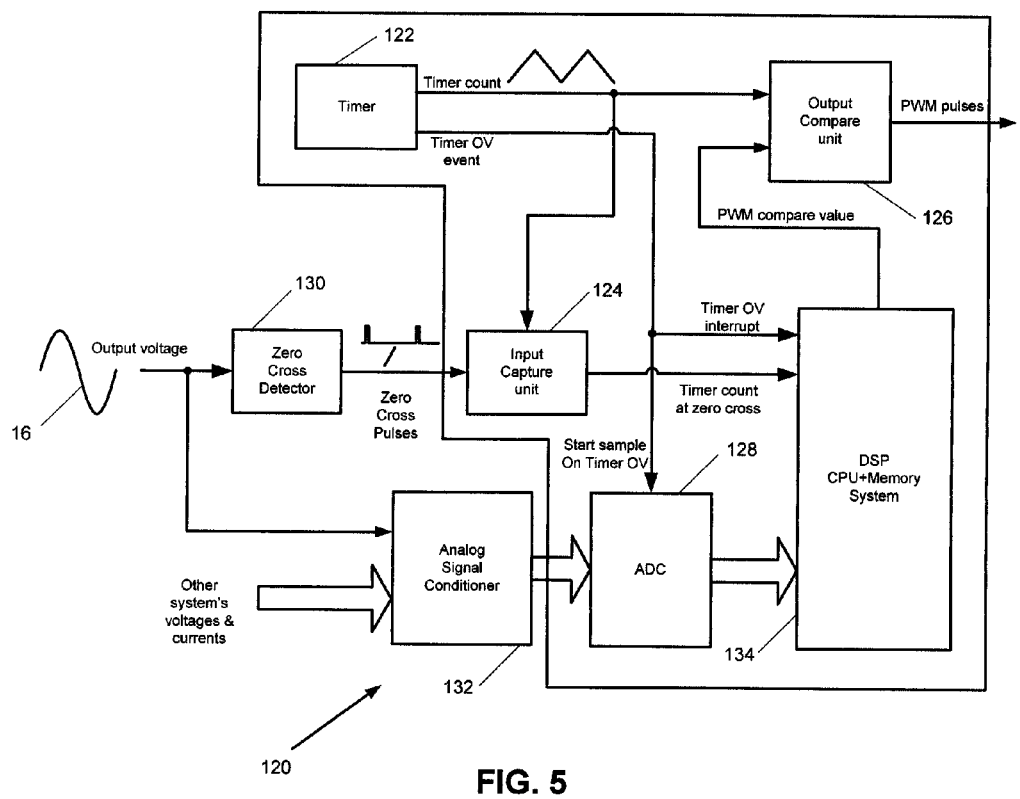
FIG. 5 illustrates a block diagram of a timer that may be used with embodiments of the present invention.

Referring now to FIG. 5, a block diagram of a controller implementation is illustrated for practicing the present method, and is generally identified by the numeral 120. Controller 120 is based on a digital signal processor (DSP) equipped with the following components: timer 122; input capture unit 124; output compare unit 126; ADC 128; zero cross detector 130; analog signal conditioner 132; and memory system 134. Components 122, 124, 126, 128 and 134 are found in commercial DSP or microcontrollers on a single-chip device.

Figure 6:
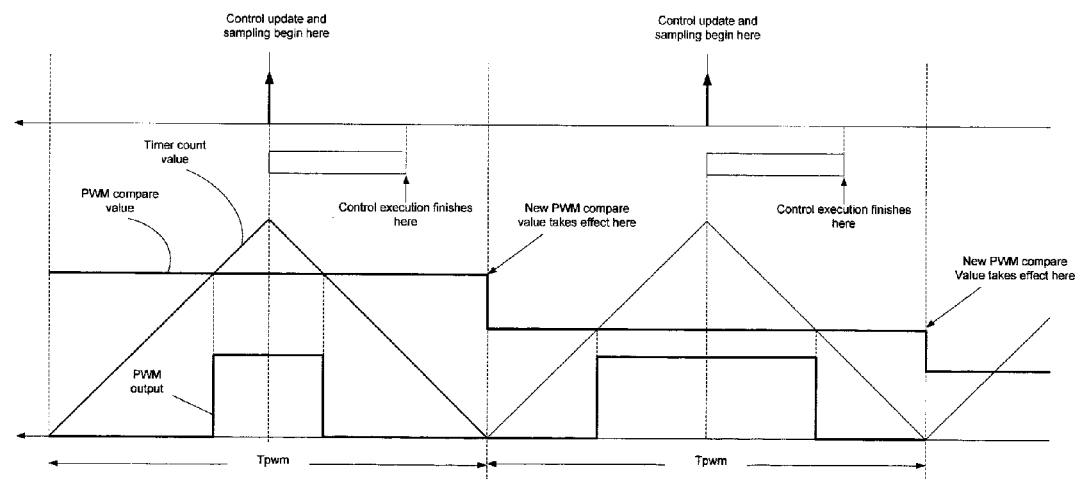
FIGS. 6 and 7 illustrate timing diagrams of embodiments utilizing the present method.

Timer 122 is programmed for up/down counting mode, in which mode the timer 122 starts counting from 0 to a specified programmable timer period count, and then counts down toward 0 again as illustrated in FIG. 6. The output of timer 122 is fed into output compare unit 126 which generates PWM output pulses based on the PWM compare value controlled by the DSP program. When the count of timer 122 is less than the PWM compare value, the PWM pulse output is LOW, and when the count is larger, the output is HIGH as shown in FIG. 6. Timer 122 is also programmed to generate interrupts to the CPU when timer 122 attains its period count (overflow OV event) at which point timer 122 will also automatically trigger the start of the sampling and conversion of the analog signal at the input of ADC 128. Upon seeing timer 122 overflow interrupt, the CPU will start executing the control code program to update a new PWM pulse compare value.

The output compare unit 126 is programmed such that the new PWM compare value will not take effect until the timer 122 count reaches zero again (under flow). In this manner the control code program has up to one-half of the total PWM period (T PWM) (FIG. 6) to complete executing the program to update a new PWM compare value. Using the mechanism shown in FIG. 6, guarantees that the control sampling and update time always is synchronized with the PWM pulse generation as shown in FIG. 4.

Figure 7:
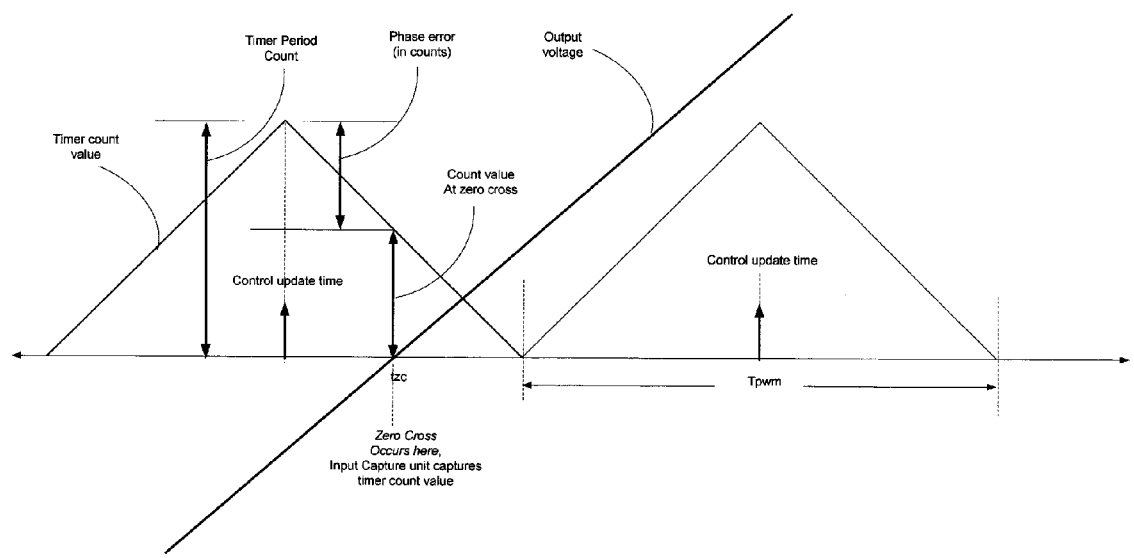

The output of timer 122 is also fed to input capture unit 124 which is configured to capture the value of the time when the input signal changes from LOW to HIGH. The zero cross detector 130 is designed to generate a pulse every time a positive going zero cross occurs on output voltage 16. When a zero cross of output voltage 16 occurs, input capture unit 124 will capture the value of timer 122 count as shown in FIG. 7. The controller 32 aligns the peak of timer 122 count value (at the Control update time) with the occurrence of output voltage zero cross. FIG. 7 illustrates how the DSP program will then be able to determine how much the control update time deviates from the output voltage zero cross. This deviation is referred to as "phase error" represented in counts, and can be given polarity (plus or minus) based on whether the control update time "leads" or "lags" the voltage zero cross. As shown in FIG. 7, this determination can be made by looking at whether the timer 122 is counting up or down when the zero cross occurs.

From FIG. 7, the phase error can be calculated as follows:

$$\text{Phase Error} = \begin{cases} +(\text{Timer Period Count} - \text{Count Value@ } ZC) & \text{if } ZC \text{ occurs when counting up} \\ -(\text{Timer Period Count} - \text{Count Value@} ZC) & \text{if } ZC \text{ occurs when counting down} \end{cases}$$

In order to achieve the PWM pulse synchronization to the output voltage 16 zero crosses, the controller (32, 48) must force the phase error term above to zero and at the same time maintain a fixed integer N number of PWM pulses every one line cycle of the output voltage. If the output voltage reference is given by:

$$V_{ref} = V_{max} \cdot \sin(2 \pi f_1 \cdot t)$$

where $f_1$ represents the fundamental frequency of the voltage reference, then in order to keep an N number of pulses every one cycle of the output voltage, the PWM pulse frequency must be maintained at N·$f_1$. For a very good and tight closed loop control of the output voltage, the frequency $f_1$ can be obtained directly from the reference voltage above. Alternatively this frequency can also be derived by an actual measurement of the interval between two consecutive zero crosses of the output voltage.

Figure 8:
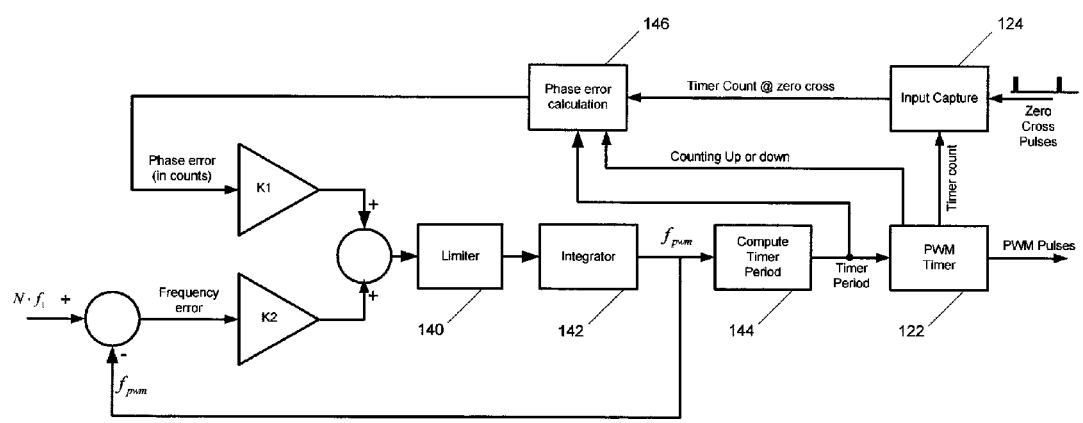
FIG. 8 illustrates a block diagram of a circuit to implement the present method.

FIG. 8 illustrates an algorithm that can be used to force the phase error term to zero and force the PWM pulse frequency to the N multiple of the fundamental frequency $f_1$. It uses the following formula to periodically compute a new PWM frequency which will then be used to update the Timer period count of the PWM timer:

$$f_{pwm} = \int (K_1 \cdot \text{Phase\_Error} + K_2 \cdot \text{Frequency\_Error}) dt$$

Where the frequency error is computed from:

$$\text{Frequency\_Error} = N \cdot f_1 - f_{pwm}$$

This computation can be done for example every one line cycle or can be conveniently programmed to execute every time a new voltage zero cross occurs. As shown in FIG. 8, a limiter 140 is inserted at the input to the integrator 142 to limit the rate at which the PWM frequency is allowed to change every update. This operation ensures that the changes to PWM timer period is done gradually enough as not to disrupt the controller's timing environment or affect performances of other digital control loops such as the closed-loop control of the output voltage and the load sharing control loop. The new timer period 144 in FIG. 8 can be calculated from the PWM frequency as follows:

$$\text{Timer period} = \frac{T_{pwm}}{2} = \frac{1}{2} \frac{1}{f_{pwm}}$$

The phase error block 146 uses this period count, along with timer count at zero cross obtained from the input capture 124, and the fact whether the zero cross occurs when timer 122 is counting up and down, to determine the phase error using the above mentioned formula.

In the preceding discussion, the output voltage zero cross is assumed to be detected using an actual direct measurement of the output voltage. However, in cases where a very good and tight closed loop control of the output voltage is achievable, the output voltage zero cross can also be conveniently derived from the internally generated sinusoidal voltage reference, just as the output voltage frequency f1 can. As previously stated, this internally generated voltage reference is normally derived by controllers 32 and 48 from an alternate AC source voltage 30 measured by both units or from an internally generated voltage reference fed commonly to both units. In this case, the time at which zero cross occurs may be computed directly from the internally generated voltage reference without the need of a separate zero cross detector hardware.

Other and further embodiments utilizing one or more aspects of the inventions described above can be devised without departing from the spirit of Applicant's invention.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

The invention claimed is:

1. A method for pulse width modulated (PWM) pulse synchronization in a parallel power supply system comprising:
   providing at least first and second power supplies connected in parallel, wherein each power supply is connected to a common output bus voltage having a zero voltage crossing, a control update point for each of a plurality of PWM pulses and a cycle period;
   measuring a time period between the zero voltage crossing and the control update point for one of the PWM pulses; and
   adjusting the control update points according to the measured time period, such that the PWM pulses coincide with the zero voltage crossing.

2. The method of claim 1, wherein the at least first and second power supplies are uninterruptible power supply units (UPS).

3. The method of claim 1 further comprising adjusting a sample rate to a fixed number of PWM pulses in one cycle period of the bus voltage.

4. The method of claim 1 further comprising:
   sampling the bus voltage at a predetermined sample rate;
   determining a frequency of the bus voltage; and
   adjusting the sample rate to a fixed number of PWM pulses in one cycle period of the bus voltage.

5. The method of claim 4 in which the frequency of the bus voltage is determined from measurement of time between consecutive zero crosses of the output voltage.

6. The method of claim 4 in which the frequency of the bus voltage is determined from an internally generated voltage reference derived from a voltage fed commonly to all UPS units.

7. The method of claim 1 in which the zero voltage crossing of the bus voltage is detected by each controller from an internally generated voltage reference derived from a voltage fed commonly to all UPS units.

8. The method of claim 1 in which adjusting the control update points to coincide with the detected zero voltage crossing includes continuously adjusting a PWM pulse frequency based on a phase error and a frequency error.

9. The method of claim 8, whereby the rate of change of the adjustment is limited to provide a gradual change of the PWM frequency over time.

10. A system for pulse width modulated (PWM) pulse synchronization, comprising:
   at least first and second power supplies connected in parallel, wherein each power supply is connected to a common output bus voltage having a zero voltage crossing, a control update point for each of a plurality of PWM pulses and a cycle period; and
   at least first and second processors configured to control the first and second power supplies, respectively, wherein the processors are each configured to measure a time period between the zero voltage crossing and the control update point for one of the PWM pulses, and wherein the processors are further configured to adjust the control update points according to the measured time period, such that the PWM pulses from both the first and second power supplies coincide with the zero voltage crossing.

11. The system of claim 10, wherein the at least first and second power supplies are uninterruptible power supply units (UPS).

12. The system of claim 10, wherein the control update points are adjusted with a limited a rate of change to provide a gradual change of the PWM frequency over time.

13. A method for pulse width modulated (PWM) pulse synchronization in a parallel power supply system comprising:
    providing at least first and second power supplies connected in parallel, wherein each power supply is connected to a common output bus voltage having a zero voltage crossing and a cycle period, each power supply providing a plurality of PWM pulses with a control update point for each PWM pulse;
    measuring a time difference and a phase difference between the zero voltage crossing and the control update point for one of the PWM pulses; and
    adjusting the control update points according to the measured time difference and phase difference, such that the PWM pulses coincide with the zero voltage crossing.

14. The method of claim 13 further comprising:
    sampling the bus voltage at a predetermined sample rate;
    determining a frequency of the bus voltage; and
    adjusting the sample rate to a fixed number of PWM pulses in one cycle period of the bus voltage.

15. The method of claim 14 wherein the output bus voltage is sampled at each control update point during each PWM pulse.

16. The method of claim 14 wherein adjusting the control update points such that the PWM pulses coincide with the zero voltage crossing including adjusting the sample rate.

17. The method of claim 13 wherein each PWM pulse is centered on each control update point.

18. The method of claim 13 wherein the control update points are adjusted with a limited a rate of change to provide a gradual change of the PWM frequency over time.

19. The method of claim 13 wherein a first processor of the first power supply and a second processor of the second power supply independently measures the time and phase difference for the PWM pulses generated by the respective power supplies.

20. The method of claim 13 wherein synchronization of the PWM pulses does not require any additional communication between the first and second power supplies, and wherein synchronization of the PWM pulses does not require any additional wiring between the first and second power supplies, rather both the first and second power supplies rely on locally measured time and phase differences to synchronize the PWM pulses.

* * * * *